M. L. BURKHARDT.
ICE CREAM CUTTER.
APPLICATION FILED JUNE 12, 1911.

1,042,080. Patented Oct. 22, 1912.

WITNESSES
INVENTOR
MARTIN L. BURKHARDT
BY
ATTORNEYS

UNITED STATES PATENT OFFICE.

MARTIN L. BURKHARDT, OF MINNEAPOLIS, MINNESOTA, ASSIGNOR OF ONE-HALF TO JAMES P. McCABE, OF MINNEAPOLIS, MINNESOTA.

ICE-CREAM CUTTER.

1,042,080.  Specification of Letters Patent.  Patented Oct. 22, 1912.

Application filed June 12, 1911. Serial No. 632,734.

*To all whom it may concern:*

Be it known that I, MARTIN L. BURKHARDT, of Minneapolis, county of Hennepin, State of Minnesota, have invented certain new and useful Improvements in Ice-Cream Cutters, of which the following is a specification.

In the operation of filling ice cream cones it has been customary to use a spoon, dipping the cream out of the freezer with one hand and filling the cone held in the other hand. This method of filling cones has been found objectionable, as it is not only slow, and cream not only drops from the spoon, and is lost, but frequently becomes smeared over the outside of the cone.

The object of my present invention is to provide means for cutting a cone of ice cream out of the mass in the freezer and ejecting it from the cutter directly into the cone, without wasting the cream or smearing the top or the outside of the cone.

Other objects of the invention will appear from the following detailed description.
The invention consists generally in cutting knives having a suitable handle, and a sliding ejector operating to draw the knives together to form the cream into a cone-shaped mass and separating the knives to eject the mass into the cone or holder.

Figure 1:
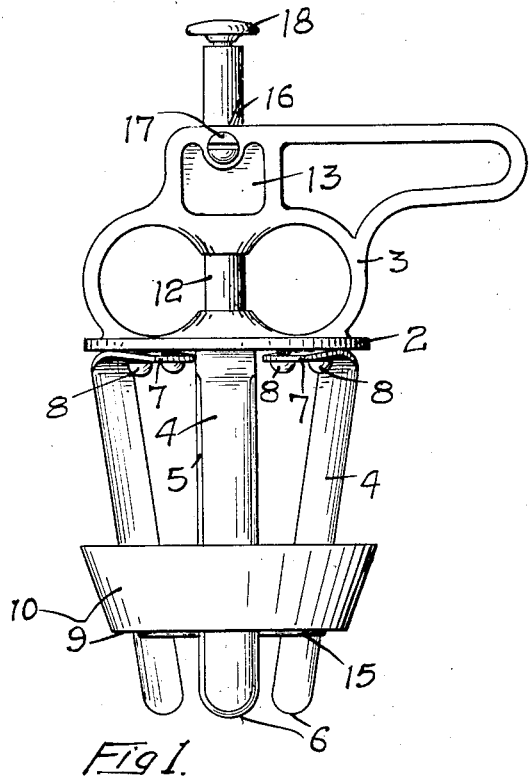
Figure 2:
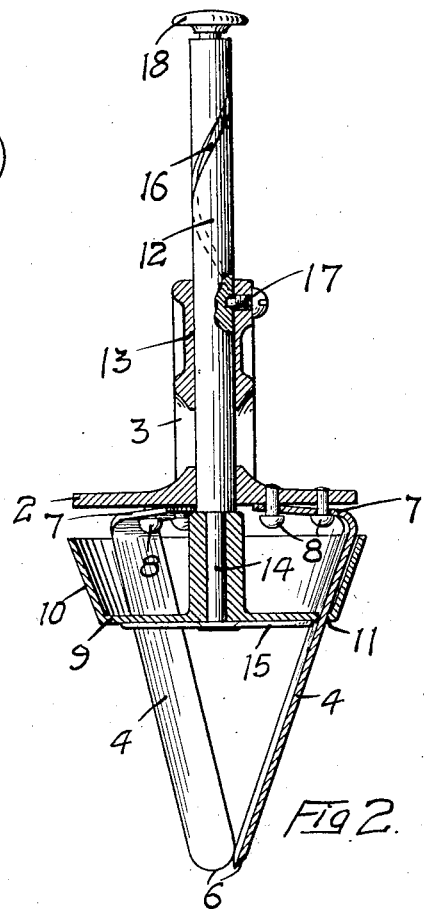
Figure 3:
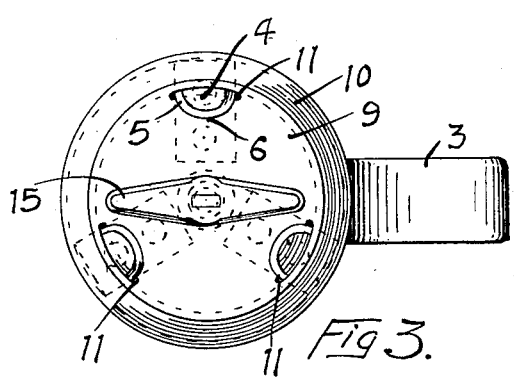

In the accompanying drawings forming part of this specification, Figure 1 is a side view, Fig. 2 is a sectional view showing the construction of the ejector, Fig. 3 is an end view.

In the drawing, 2 represents the head of the device having a handle 3 mounted thereon. The knives 4 are composed, preferably, of sheet metal having beveled edges 5 and blunt forward ends 6. The opposite ends 7 of the knives are bent inwardly and are loosely secured to the head 2 by rivets 8 or other suitable fastening means which will allow oscillation of the knives in and out, toward and from, one another, in the operation of the device. The knives are preferably curved slightly in cross section for convenience in cutting out the cone of cream.

9 is an ejector disk, formed preferably in the shape of a shallow, truncated cone, having an outer taper surface 10 and provided with curved slots 11 to receive the knives 4. The ejector is freely slidable back and forth on the knives, drawing their outer ends to-
gether as the ejector is retracted toward the head 2 and separating the knives as it is forced toward the ends thereof.

12 is a spindle having a bearing 13 in the handle portion 3 and a reduced forward portion 14 on which the ejector device is mounted. At the extreme end of the reduced portion 14 is a blade 15 which is adapted to sweep over the flat outer surface of the ejector and prevent the cream from sticking thereto. The spindle is provided with a spiral groove 16 running lengthwise thereof that is adapted to receive a pin 17 tapped into the handle portion 3. The outer end of the spindle has a finger piece 18.
In the operation of the device, the ejector being in its projected position, as shown in Fig. 1, the knives are thrust into the cream and the pressure of the cream will force the ejector backward to the position shown in Fig. 2. The device is then rotated and the cone of the cream cut out and lifted from the freezer, the cone being held between the knives. The thumb of the operator is then applied to the end of the spindle and the ejector is projected forward, driving the cone of cream out from between the knives, and at the same time the scraper 15 is revolved to separate the cream from the ejector. The cone is of sufficient size to fill the receptacle and is of corresponding shape, and one cone of cream will exactly fill the receptacle into which it is discharged. The device is then thrust into the freezer again and the operation repeated.
With this device all spoons and like means for removing the cream from the freezer are eliminated, there is no danger of spilling or wasting the cream, or for it to become smeared on the outside of the receptacle.

I do not wish to be confined to the particular means shown for mounting the knives on the head or plate, as various means may be utilized for this purpose and still be within the scope of my invention.

I claim as my invention:—

1. An ice cream cutter comprising a head having a suitable handle, knives mounted at one end on said head and projecting outwardly therefrom, a spindle slidably mounted in said head, an ejector connected with said spindle and slidable on said knives, the inward movement of said ejector operating to draw said knives together, and outward movement of said ejector forcing the cream from between said knives.

2. An ice cream cutter comprising a head having a handle, knives pivoted at one end on said head and adapted to swing toward and from one another, a cream ejecting device slidably mounted on said knives and operating, when retracted by the pressure of the cream, to draw the outer ends of said knives together, and when projected to discharge the cream from between said knives.

3. An ice cream cutter comprising a head having a suitable handle, cream cutting knives held against longitudinal movement but having a limited lateral movement, a sliding ejector and means for separating the cream from said ejector.

4. An ice cream cutter comprising a head having a suitable handle, knives carried by said head and movable toward and from one another a sliding ejector and a revolving spindle mounted in said head and connected with said ejector.

5. An ice cream cutter comprising a head, a handle therefor, cream cutting knives carried by said head, and movable toward and from one another a sliding ejector, a spindle mounted in said head and having a spiral groove therein, a pin fitting within said groove, said spindle being attached at one end to said ejector and having a finger piece at its opposite end.

6. An ice cream cutter comprising a head having a handle, cream cutting knives, a sliding ejector, a revolving spindle whereon said ejector is mounted, said spindle having a longitudinal and a rotary movement in said head, and a scraper blade carried by said spindle and engaging said ejector.

7. An ice cream cutter comprising a head having a handle, knives having inwardly turned ends loosely mounted on said head, said knives being curved slightly in cross section and having blunt forward ends and adapted to swing toward and from one another, an ejector slidably mounted on said knives and adapted to be retracted under pressure of the cream when the knives are thrust therein, the outward movement of said ejector operating to discharge the cream from between said knives.

8. A device of the class described comprising a head having a handle, knives loosely mounted on said head and capable of oscillation toward or from one another, an ejector slidably mounted on said knives and adapted to be retracted thereon under pressure of the cream, outward movement of said ejector operating to discharge the cream from between said knives, and a scraper device operating to separate the cream from said ejector during the cream discharging operation.

9. An ice cream cutter comprising a head having a suitable handle, cream cutting knives mounted on said head and free to move toward and from one another and held against longitudinal movement, and means for ejecting the cream from between said knives, said ejector being forced backwardly between said knives by pressure of the cream thereon as the knives are drawn together.

10. An ice cream cutter comprising a head having a handle, cream cutting knives mounted on said head and movable toward and from one another, an ejecting device slidably mounted on said knives, said ejecting device being moved backwardly by the pressure of the cream and drawing the outer ends of the knives together, and means for forcing said ejecting device outwardly to separate the knives and discharge the cream from between them.

In witness whereof, I have hereunto set my hand this 9th day of June 1911.

MARTIN L. BURKHARDT.

Witnesses:
GENEVIEVE E. SORENSEN,
EDWARD A. PAUL.